Patented Aug. 30, 1927.

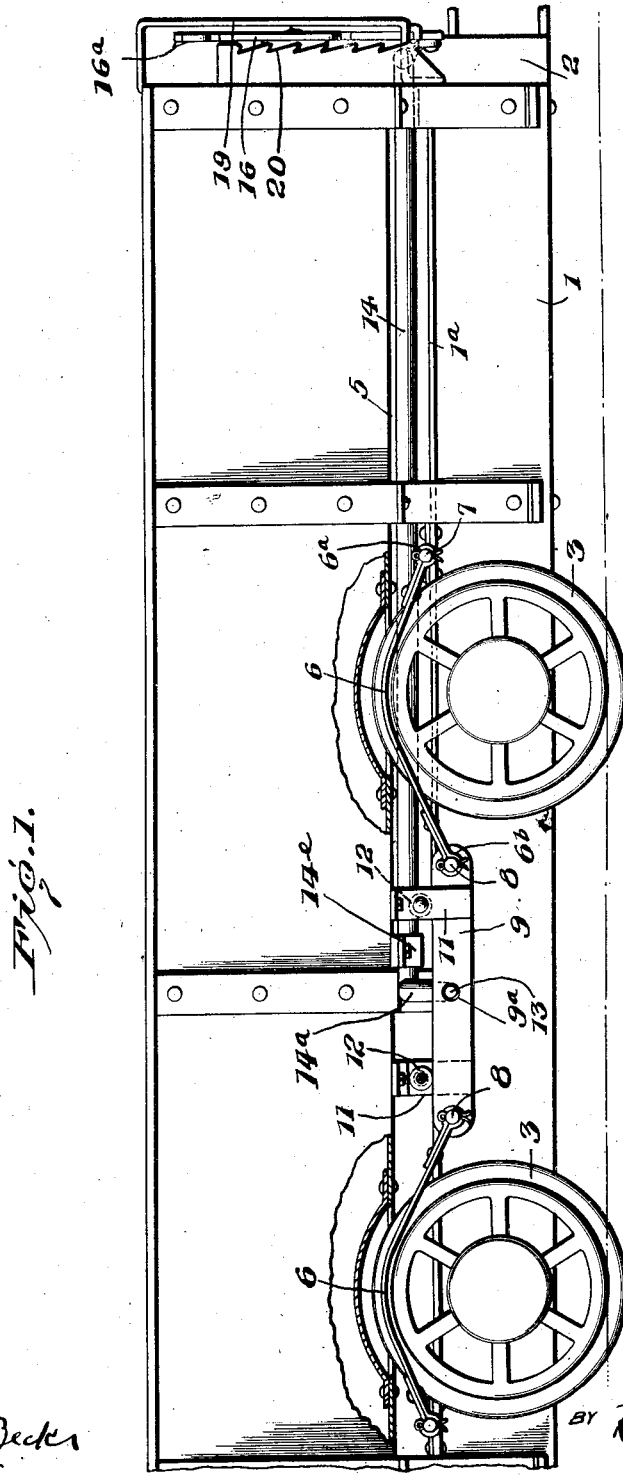

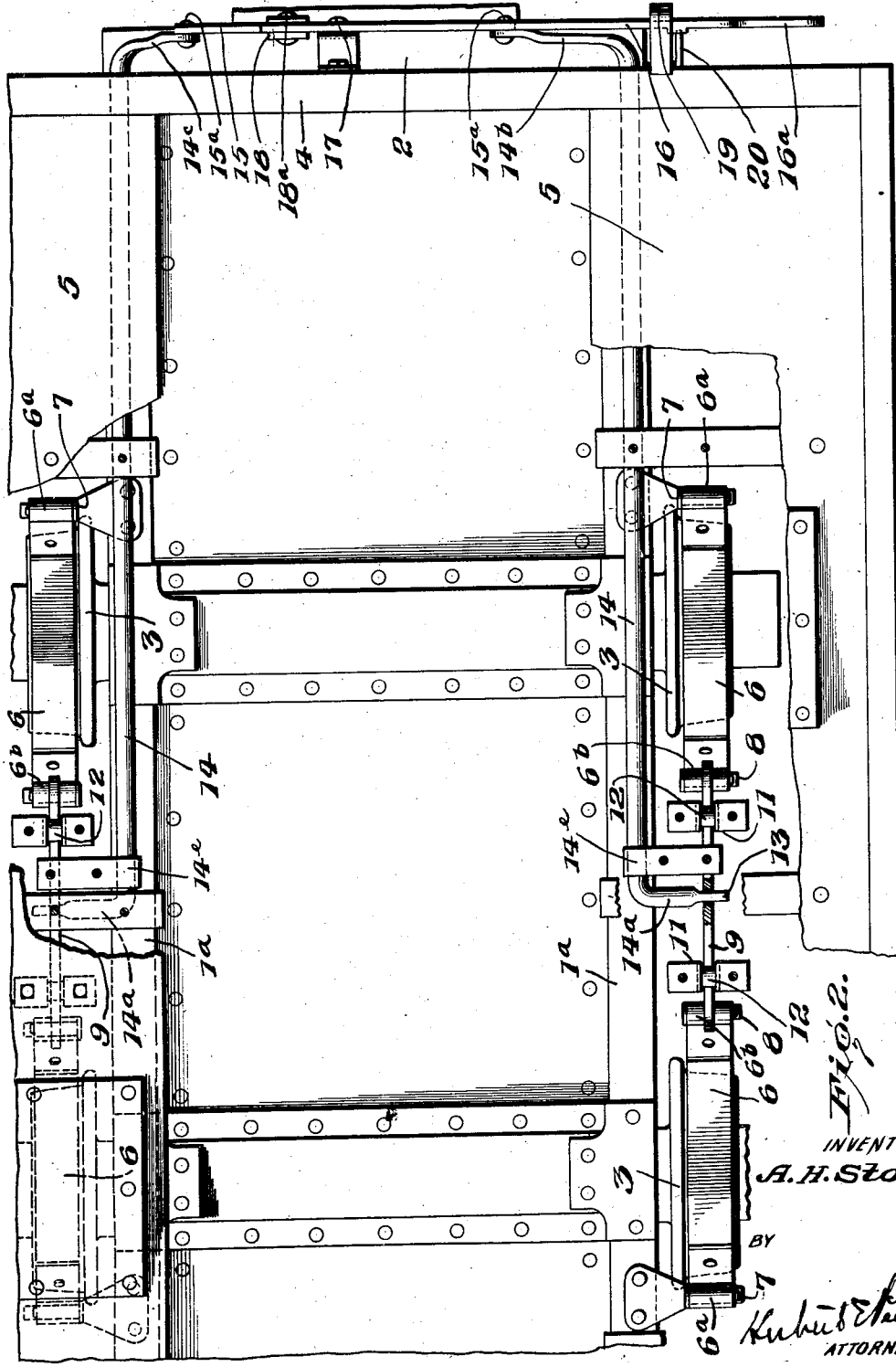

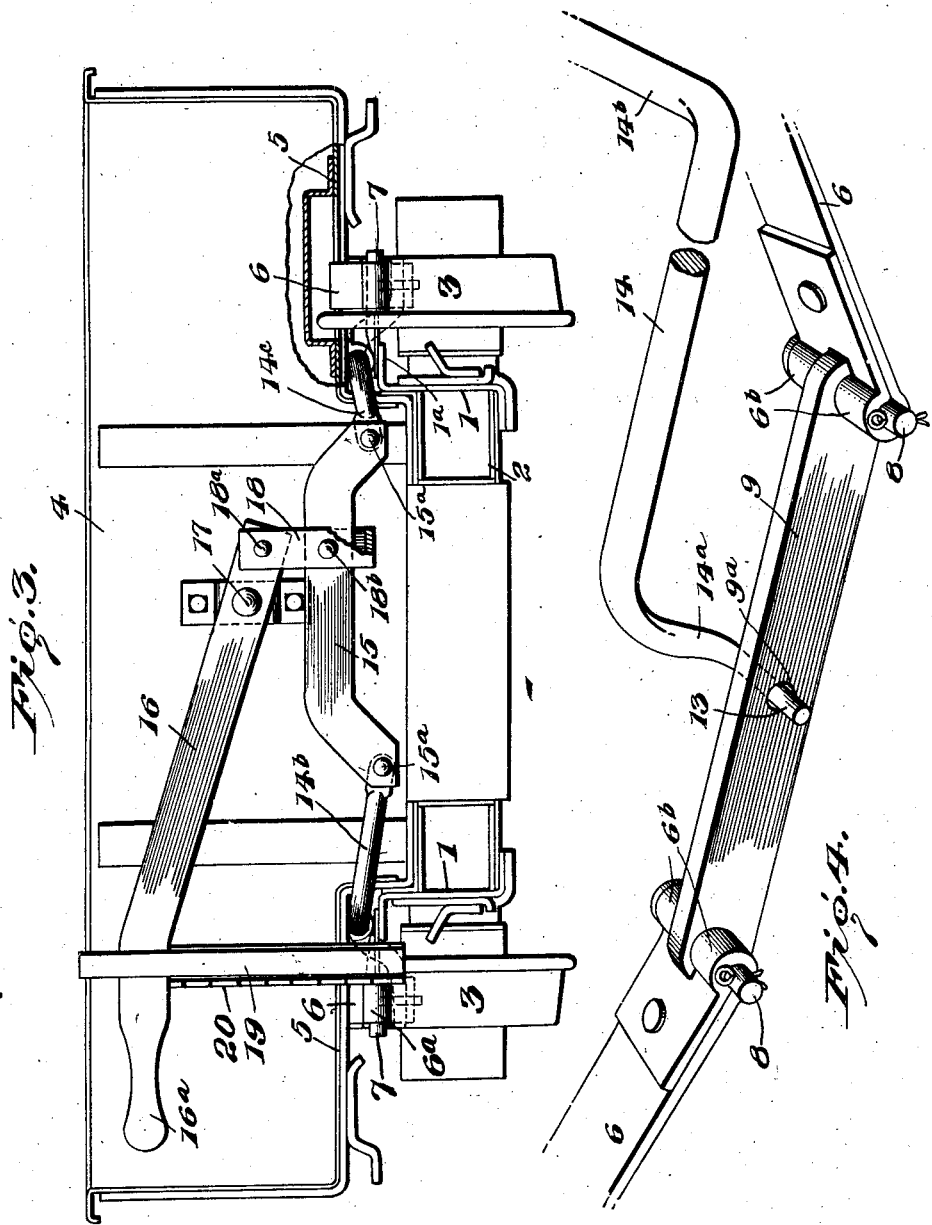

1,640,474

UNITED STATES PATENT OFFICE.

AUDLEY HART STOW, OF CHARLESTON, WEST VIRGINIA, ASSIGNOR TO EDITH S. WHITE, OF CALDWELL, NEW JERSEY.

BRAKE FOR MINE CARS AND OTHER VEHICLES.

Application filed January 24, 1923. Serial No. 614,651.

This invention relates to certain improvements in mine car braking apparatus; and the objects and nature of the invention will be readily understood by those skilled in the art in the light of the following explanations of the accompanying drawings illustrating what I now believe to be the preferred mechanical expression or embodiment of my invention from among other forms, constructions and arrangements within the spirit and scope thereof.

An object of the invention is to provide simple, durable and efficient mechanism for approximately uniformly distributing the braking force or pressure to the several wheels of the car from a single actuating device of maximum power or leverage.

With this and other objects in view, my invention consists in certain novel features in construction, and in combinations and arrangements as more fully and particularly set forth and specified hereinafter.

Referring to the accompanying drawings:—

Fig. 1 shows in side elevation, a portion of a mine car, equipped with an embodiment of my invention, portions of the car being broken away.

Fig. 2 is a top plan view of the car of Fig. 1, parts being broken away.

Fig. 3 is an end view of the car, parts being broken away.

Fig. 4 is a detail perspective.

In the drawings, I show a wing-type mine car, wherein the longitudinal structural steel side sills 1, of the car traction truck embody vertical webs and out-turned horizontal top edge flanges or members 1$^a$, and wherein the traction truck also embodies end or cross sills 2 secured to the side sills, and car wheels 3 arranged outwardly beyond the outer side faces of the longitudinal sills and under the wings or overhangs of the lading retaining body of the car, and rotatable on axes arranged tranversely of and intersecting the longitudinal sills intermediate the top and bottom edges thereof, although I do not wish to so limit my present invention.

That portion of the lading retaining body of the car that is arranged above the traction truck comprises suitable vertical transverse ends, such as a fixed end wall or plate 4, closing the ends of the lading space of the car, and suitable side walls formed by steel plates rising from the longitudinal sills and extending outwardly and upwardly to form the wings having floors 5 above the car wheels and, if need be, recessed to receive the upper portions of such wheels, although I do not wish to so limit my invention, nor do I wish to limit all features of my invention to wing type mine cars.

In the particular example illustrated, the car is carried by four wheels of like diameter, arranged at the middle portion of the car, and rotatable on two parallel axes so that a pair of spaced wheels 3 is arranged on each side of the car, and a problem of the braking mechanism is to provide braking force at the wheels sufficient in power to control the car and to approximately uniformly distribute the braking force to the four wheels.

In this example, the braking force is applied to the wheel treads through the medium of brake shoes in the form of flexible steel or other suitable material brake bands 6, one for each wheel. Each band 6, is arranged longitudinally of the car and extending over its particular wheel in such manner that the central portion of the length of the band lies over or circumferentially engages the crown or top portion of the wheel tread, and the band assumes a downwardly arched, bowed, or concave form over the wheel tread.

At one end, the brake band is secured to a fixed part while the opposite end of the band is secured to movable means through the medium of which the band is operated to perform its braking functions. In this instance, the relatively fixed end of the brake band 6 is fixed to and provided with a transverse bearing sleeve 6$^a$ and this sleeve is confined on a strong rigid cylindrical stud or pin 7 projecting outwardly and horizontally from the adjacent side sill 1 of the car to which it is rigidly secured. For instance, this stud is spaced from the car wheel and arranged between the same and the adjacent car end and is fixed on the top out-turned flange 1$^a$ of the car sill. This description applies to all four brake bands and their fixed securing studs 7.

The opposite ends of the brake bands are located between the car wheels and are also provided with transverse bearing sleeves or eyes 6$^b$ that receive coupling pivot pins 8 by which said ends of the bands are secured to the ends of vertically movable band applying and controlling equalizer bars 9, arranged longitudinally of the car between the car wheels.

A bar 9 is arranged at each side of the car, one for each pair of car wheels, and the brake bands for the wheels of each pair are coupled together by the bar 9 at that side of the car. Each bar 9 connects the ends of the brake bands that depend between the adjacent car wheels, the end of one brake band is coupled to the adjacent end of bar 9 by a sleeve 6$^b$ and pin 8, and the end of the other brake band is coupled to the other end of the bar 9 by its sleeve 6$^b$ and pin 8. The brake bands are preferably removably secured by the transverse pins 7, and 8, to permit brake band removal and replacement when required by wear or damage. The downward or braking pressure of the bands 6 on the crowns of the car wheel treads, is controlled by vertical movement of the bars 9, and in this example, the braking pressure is downward in the direction of the vertical diameters of the wheels and undue wear on the wheel bearings and axles is thereby avoided.

Each bar 9 is in this instance, longitudinally elongated, and in the form of a strong stiff flat bar, arranged vertically on edge to present vertical flat side faces engaged at both side faces by vertical guide plates 11, arranged in pairs, and fixed to and depending from the wing floors 5, to confine the bar to vertical movement and maintain the bar in its vertical position holding the brake shoes against twisting and with their flat wheel tread engaging surfaces concentric or parallel with the treads to be engaged thereby. Within the upper ends of the guides formed by the pairs of depending plates 11, I show transverse stops 12 to engage the top longitudinal edge of the bar 9 and limit upward movement of said bar. When the bar is thus at its limit of upward movement, the two brake bands that are connected by the bar, are both held upwardly by said bar from braking engagement with the wheel treads. When the bar is forced downwardly, the two brake bands are drawn down into braking engagement with the wheel treads, and one feature of my invention is to so mount and apply the force or power to said bar 9 as to distribute the braking force approximately uniformly to the two brake bands and consequently to the two wheel treads, in other words so that the braking force applied to one wheel will be, to all intents and purposes, the same as that applied to the other wheel. In the particular example illustrated, this result is gained by mounting and arranging the bar 9 to act as an evener or equalizer, in that the bar is vertically rockable and pivotally coupled to the adjacent ends of the two brake bands and the brake applying force or power is centrally applied to the bar, at a point midway its ends. The arrangement is such that the evener or equalizing bar can rock vertically on a central transverse axis and from either end on either transverse axis 8, 7.

In this example, the evener bar is formed with a central transverse bearing opening 9$^a$, receiving a horizontal outwardly-projecting stud or fulcrum 13 on which the bar is vertically rockable and by which the bar is raised and lowered and held at the desired elevation. Mechanism is provided to simultaneously raise and lower the fulcrums 13 of the two bars 9 by actuating means preferably arranged at one end of the car and to equally distribute the power of said actuating means between the two fulcrums 13 with the end in view of applying all four brake bands to their wheels with like pressure.

In the particular embodiment shown, two rock shafts 14 are arranged longitudinally of the car, one on each side thereof, extending from one end of the car to a point midway between the car wheels. The inner ends of these rock shafts are formed with outwardly extending crank arms 14$^a$ that terminate in the elongated fulcrums 13 that loosely fit in and extend through the bearing openings 9$^a$ in the equalizer bars 9. The outer ends of the two shafts 14 are formed with lateral crank arms located outwardly beyond the end wall 4 and over the end sill or bumper 2. These two outer crank arms extend in opposite directions, i. e. towards each other, and (in this instance) one crank arm, 14$^b$, is approximately twice the length of the other arm, 14$^c$.

These two crank arms 14$^b$, 14$^c$, are pivotally joined by an actuating member in the form of a strong stiff yoke or bar 15 that constitutes a transverse universal equalizer or evener bar or member.

The ends of the member 15 are pivotally joined to the inner, or otherwise free, ends of the shaft crank arms 14$^b$, 14$^c$, by transverse pivot or fulcrum pins or axes 15$^a$.

Suitable, preferably manually operated, means is provided for raising and depressing the member 15, to rock the shafts 14 for simultaneously depressing and elevating the bars 9. For instance, I show a vertically swingable hand (brake) lever 16 arranged transversely of the car and arranged outside of the end 4 above the end sill 2 and carried by and mounted on fulcrum 17. This hand lever is arranged above the member 15. The short end or nose of this hand lever is pivotally joined to an intermediate portion of the member 15 by vertical push and pull link connection 18 at its upper end joined to the nose of the hand lever by transverse pivot or axis 18$^a$ and at its lower end joined to member 15 by transverse axis or pivot 18$^b$.

The free or handle end of the lever extends from fulcrum 17 toward the upper vertical side wall of a wing of the car body but is preferably so arranged that the lever handle 16ª does not project beyond the car side but is protected from injury by being located beside the car end.

The free end of the lever is movable vertically behind a vertical guide and protecting yoke 19 and beside a vertical rack or tooth-bar 20 by which the lever can be held in the desired vertical position to hold the brake bands in the desired positions.

The brake bands can be applied by depressing the handle end of the lever 16, and released by elevating the handle end of the lever. When the brake lever is swung to apply the brakes, the nose of the lever through link 18 elevates the member 15 and consequently elevates the shaft arms $14^b$, $14^c$, to depress the two bars 9, during which movement the member 15 is bodily elevated and is free to rock vertically on the axes $18^b$, $15^a$, to equalize the pressure applied to the two bars 9.

It is not desirable, in mine car practice, to permit the brake lever to project beyond the car sides. The over all or outside dimensions of mine cars are limited. Also in mine cars, it is desirable to apply uniform brake pressure to the car wheels among other reasons, to avoid unequal wheel tread wear, and it is also desirable to provide means whereby the desired brake applying power can be secured through the medium of a hand operated brake lever. Hence, to gain the greatest possible leverage while keeping the hand or brake lever within the outside dimensions of the car, I fulcrum said lever off center with respect to the center longitudinal axis of the car. It will be noted that the lever fulcrum 17 is located off center with respect to the car end and of the distance between the two rock shafts 14, i. e. the fulcrum 17 is closer to the right hand shaft 14 than to the left hand shaft 14 (referring to Fig. 3). The handle end of the lever 16 can hence be extended in length without projecting the handle $16^a$ beyond the adjacent car side. The axis $18^a$ is located as close to the fulcrum 17 as possible while attaining the required vertical movement of the push and pull link 18 and the desired short direct vertical connection between the brake lever 16 and the vertically movable and rockable member 15. Hence the operative connection between the lever 16 and member 15, is applied off center with respect to member 15, and the member 15 is arranged off center with respect to the two shafts 14. In this example, the axis $18^b$ is applied to member 15 at a point approximately twice the distance from one end of said member than from the other end of said member, and hence to attain uniform leverage on the two shafts, the short end of the member is connected to the adjacent shaft 14 by short crank arm $14^c$ and the long end of member 15 to the other shaft 14 by long crank arm $14^b$, the crank arm $14^b$, in this example, being approximately twice as long as crank arm $14^c$.

The object of the arrangement is to provide maximum leverage and power, within the cramped quarters at the end of a mine car, and yet distribute the power attained equally between the two shafts 14.

In this example, the two longitudinal shafts 14 are mounted in suitable bearing brackets $14^e$ secured to the under sides of the wing floors 5 with the shafts located in the space above the sill flanges $1^a$ and the floors 5 so that said shafts are out of the way and protected from injury.

It is however to be noted, that the ratio of approximately 2 to 1, of the two crankshafts $14^b$ and $14^c$, which is also the ratio of the two ends of the transverse equalizer lever 15, as shown, is merely that convenient for illustration. This ratio should be made as great as otherwise practicable, say under some conditions, 3 to 1, in order to attain the maximum length of the hand lever 16, Fig. 3, possible under existing conditions.

It is also further to be noted, that the weight of the transverse equalizer lever 15, and of the crank arms $14^b$ and $14^c$, may be made equal, near enough, to the weight of the longitudinal or wheel brake equalizers 9, Fig. 1, with their attached parts. My improved brake rigging, therefore, exclusive of the hand lever 16, may be termed a balanced brake rigging. The addition of the long hand lever, however, makes my brake rigging, an overbalanced or weighted hand rigging. The power required to lift the hand lever, which is that required to take the brakes off, is stored or conserved, to add to or to increase the power available to push the hand down which is to put the brakes on. This brake rigging therefore, will exert greater breaking power, for the amount of power available, and also greater leverage, for the same amount of available space, than the brakes heretofore in use.

It is also to be further noted, when the hand lever 16, Fig. 3, is in the down position, see dotted lines, it is approximately as much below the horizontal, as it is above the horizontal, when it is in the off position. This hand lever, therefore, may be termed a horizontal hand lever, which is the lever that is required for mining thin seams of coal, for example.

The type of brake as shown, is what is termed, in mining parlance, a push down brake and is of advantage in that more power can be delivered with less effort, in a vertically downward direction than in an upward direction due in part to the fact that the miner much of the time has to work stooped down owing to the proximity of the roof.

This fully equalized brake rigging, the fundamental object of which is to apply equally independent of any unequal wear in parts braking power to all four wheels to retain same in desired degree without further attention as long as may be desired while insuring all four brake bands may also be held, when desired, from any contact whatever with the wheels, may evidently be applied suitably varied, to various types of lading carrying cars.

The flat strap brake bands may be replaced by any of the well known devices for applying the braking power to retarding the rotation of the wheels, the several details may be varied along well known lines.

It is evident that various changes, modifications and variations might be resorted to without departing from the spirit and scope of my invention and hence I do not wish to limit myself to the exact disclosures hereof.

What I claim is:—

1. In a car structure, a body having walls and a bottom, an approximately horizontal hand lever, together with an equalizer member including unequal lever arms.

2. In a car structure, a body having walls and a bottom, an approximately horizontal hand lever, a hand lever rack, together with an equalizer member including unequal lever arms.

3. In a car structure, a body having walls and a bottom, an approximately horizontal hand lever, a hand lever fulcrum, an equalizer member including unequal lever arms, together with a link connecting said hand lever and said equalizer member.

4. In a car structure, a body having walls and a bottom, an equalizer member including unequal lever arms, an approximately horizontal hand lever, together with longitudinal rocker shafts including unequal rocker shaft cranks.

5. In a car structure, a body having walls and a bottom, an equalizer member including unequal lever arms, together with rocker shafts including unequal rocker shaft cranks.

6. In a car structure, a body having walls and a bottom, a hand lever, an equalizer member including unequal lever arms, rocker shafts including unequal rocker shaft cranks, brakes adjacent to the car wheels, together with brake means operated by said rocker shafts.

7. In a car structure, a body having walls and a bottom, an equalizer member including unequal lever arms, together with rocker shafts including unequal rocker shaft cranks, said rocker shaft cranks being of approximately the same but opposite ratio to the ratio of the unequal lever arms of the equalizer member.

8. In a car structure, a body having walls and a bottom, a transverse equalizer member including unequal lever arms, a transverse hand lever, together with longitudinal rocker shafts including unequal rocker shaft cranks, said equalizer member, said hand lever and said unequal rocker shaft cranks being at one end of said body.

Signed at Philadelphia, Penna., this 18th day of November, 1922.

AUDLEY HART STOW.